United States Patent [19]

Chen

[11] Patent Number: 4,907,266
[45] Date of Patent: Mar. 6, 1990

[54] HEADPHONE-CONVERTIBLE TELEPHONE HAND SET

[76] Inventor: Ping-Huang Chen, 4 Fl., No. 10, Alley 10, Lane 44, Hsing Yi Road Sec. 2, Taipei, Taiwan

[21] Appl. No.: 198,695

[22] Filed: May 24, 1988

[51] Int. Cl.$^4$ .............................................. H04M 1/04
[52] U.S. Cl. .................................... 379/430; 379/433; 381/183
[58] Field of Search .................. 381/25, 183; 379/430, 379/433

[56] References Cited

U.S. PATENT DOCUMENTS 2,503,846  4/1950  Shann .................................... 379/430
3,621,156  11/1971  Kliewer .................................. 379/430

FOREIGN PATENT DOCUMENTS 1524956  5/1968  France ................................. 381/183
2533783  3/1984  France ................................. 379/433

OTHER PUBLICATIONS

"GE Call Maker", Washington Post Magazine, p. 41; Sep. 8, 1985.

Primary Examiner—Jin F. Ng
Assistant Examiner—Randall S. Vaas
Attorney, Agent, or Firm—Browdy and Neimark

[57] ABSTRACT

The disclosure relates to a headphone-convertible telephone hand set which can be converted into a headphone-like telephone and produce double-form or stereo-like sound in its receiver, thus permitting the present telephone to be worn on a user's head to free the user's hands as well as to improve the normal function with increased clarity.

4 Claims, 4 Drawing Sheets

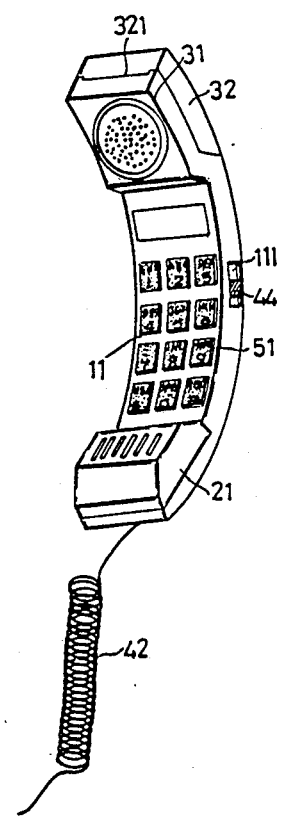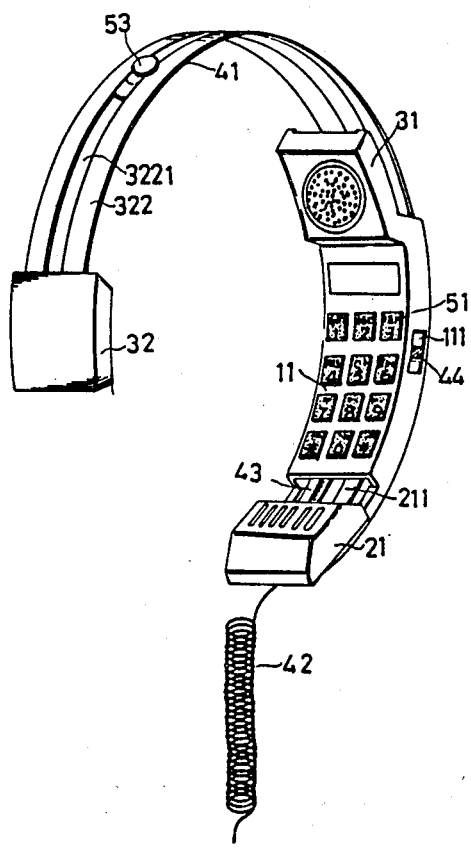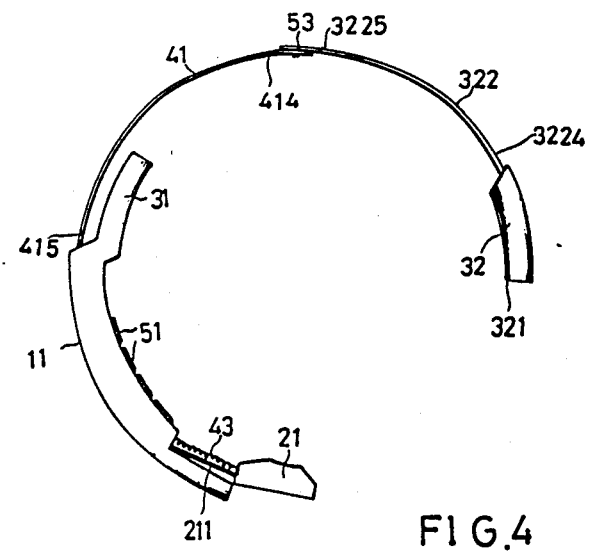

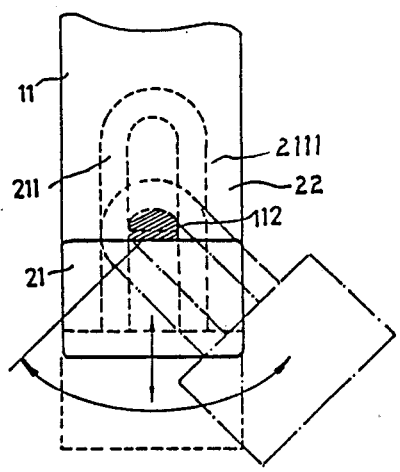
FIG.5
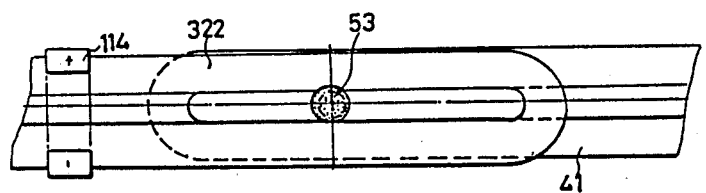
FIG.6-A
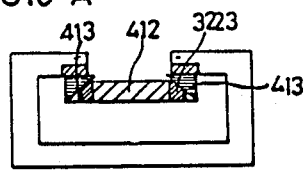
FIG.6-C
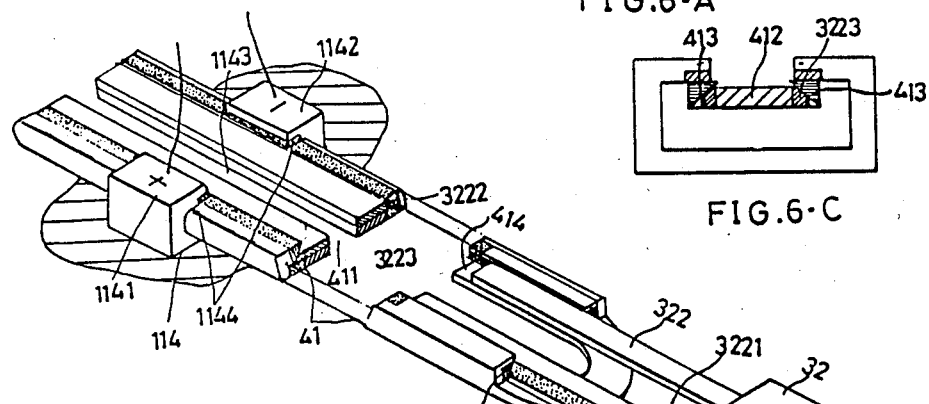
FIG.6
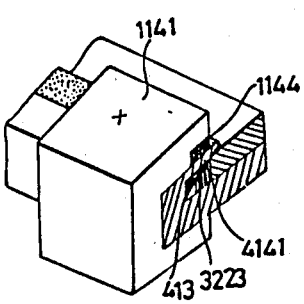
FIG.6-B
FIG.6-D

HEADPHONE-CONVERTIBLE TELEPHONE HAND SET

BACKGROUND OF THE INVENTION

The telephone is an indispensable communcational tool nowadays. Most of the conventional telephone sets have been designed in a hand-held form without substantial changes.

When using a hand-held telephone, a user must keep his or her hand occupied, holding the telephone hand set. When making phone calls frequently or for quite a long period, it will appear that keeping one hand occupied, grasping the hand set, becomes tiresome and wasteful of time.

SUMMARY OF THE INVENTION

Accordingly, to eliminate the above-mentioned shortcomings, the present invention provides a headphone-convertible telephone hand set having a receiver unit consisting of a stationary receiver and a movable receiver extensibly associated therewith. When extended outward from the telephone hand set to form a headphone, the movable receiver remains electrically connected with the inner circuit of the telephone hand set by way of a first and a second arc-shaped telescopic slide strips each having a central longitudinal slide slot to produce a double-form or stereo-like sound together with the stationary reciever.

A central longitudinal recess is formed along the upper surface of the first slide strip. for receiving the second slide strip, permitting steady relative sliding movement thereof.

The second slide strip is rigidly and electrically connected with the movable receiver at its front end and slidably joined with the first slide strip at its rear end by a join button, while the first slide strip is slidably clamped by an electrode set disposed inside the hand set electrically connected with the inner circuit thereof. The sidewalls of said recess of the first slide strip are made of conductive material, so are the two side portions of the second slide strip kept in corresponding contact therewith. With the two conductive sidewalls abutting against the two conductive plates of the electrode set respectively, when the movable receiver is drawn outward, the first slide strip can thus construct a circuit together with the second strip communicating the movable receiver with the inner circuit of the hand set to produce sounds just as the stationary receiver does.

Accordingly, since the telephone hand set can be converted into a headphone producing double-form or stereo-like sound, the user can wear the headphone-type telephone keeping his or her hands free to do normal work at his or her own convenience. Furthermore, double-form sound in the receiver will be clearer to hear than single-form sound, thus the user can receive more reliable messages.

BRIEF DESCRIPTION OF THE DRAWINGS

FIG. 2 shows a three-dimensional perspective view of the assembled telephone handset of the present invention;

FIG. 3 shows a three-dimensional perspective view of the headphone-like telephone handset of the present invention with the movable receiver drawn outward from the handset according to FIG. 2;

FIG. 4 is a lateral view of the present invention according to FIG. 3;

FIG. 5 is an enlarged plan view of the transmitter of the present handset illustrating the adjustment thereof;

FIG. 6 shows a view of the first and second slide strips of the present handset assembled together with the first strip clamped by two electrodes of a electrode set;

FIG. 6A is an enlarged plan view of the first and second slide strips joined with each other by a join button;

FIG. 6B is a fragmentary view illustrating the contact and assembly of the electrode the first slide strip and the second slide strip for constructing a circuit communicating the movable receiver with the inner circuit of the present handset;

FIG. 6C is a cross-sectional view taken on line 6—6 in FIG. 6B;

FIG. 6D is fragmentary view of the electrode and the totally retracted first and second slide strip according to FIG. 6B, illustrating the cut-off condition effected by way of the insulating upper surface of the first slide strip.

DESCRIPTION OF THE PREFERRED EMBODIMENT

Figure 1:
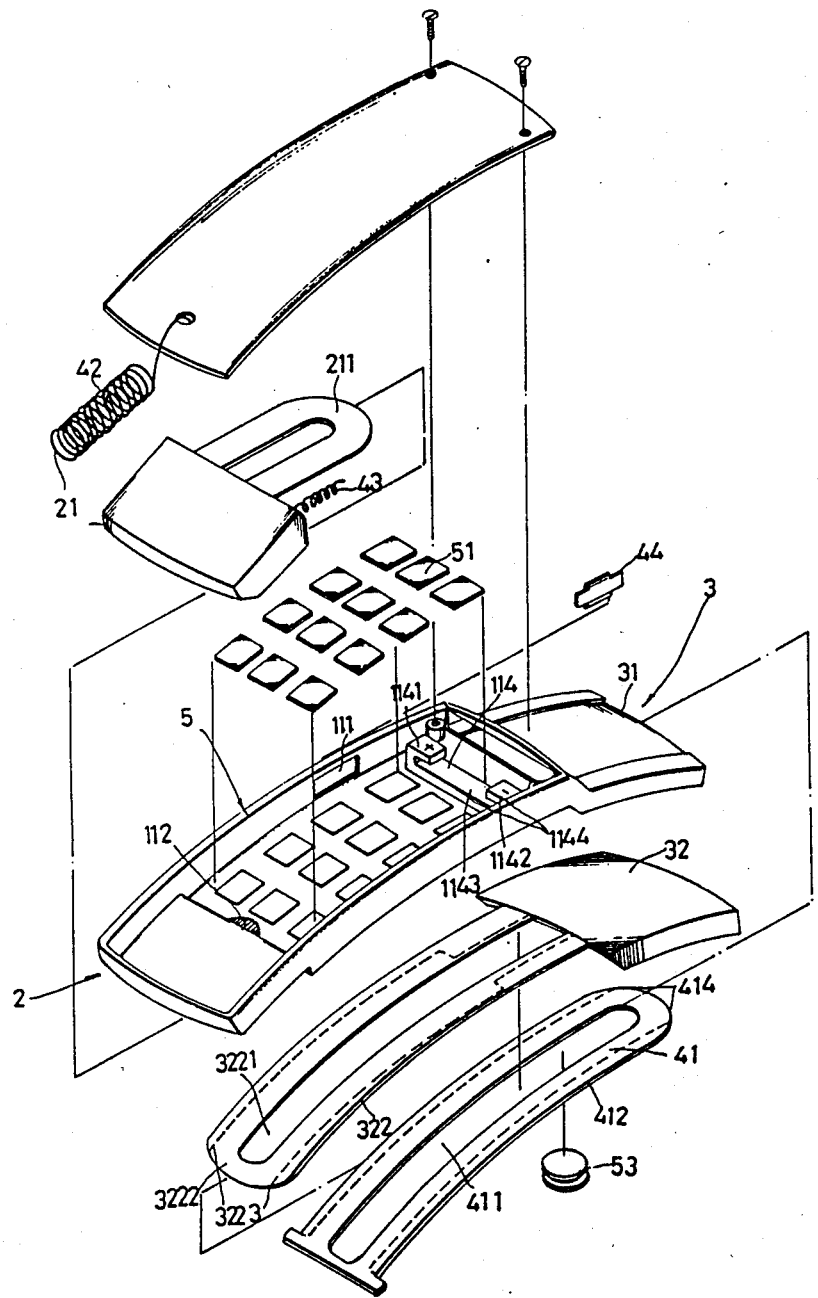
FIG. 1 is an exploded view of the telephone handset of the present invention.

Referring first from FIG. 1 to FIG. 3, the telephone hand set 11 of the present invention is shaped in an arcuate form with its receiver unit 3 disposed at the upper end, and the transmitter unit 2 at the lower end and a button board portion 5 provided therebetween as in a conventional telephone. A slide switch 44 is set within a side slot 111 to effect the switch-on or off of the power resource instead of using a conventional hang-up type switch. Referring particularly from FIG. 3 to FIG. 5, a transmitter 21 of said transmitter unit 2 is provided with an upper slide member 211 having an internal slide slot 2111 through which the slide member 211 can be slidably pivotably moved by a guide member 112 provided on a transmitter seat 22 of said transmitter unit 2. With the above arrangement, the transmitter 21 can be adjustably extended outward from said transmitter seat 22 and selectively pivoted to get closer to the user's mouth.

The transmitter 21 is electrically connected with the inner circuit received in the hand set 11 by an extendible wire 43, thus permitting the transmitter 21 itself to remain connected with said inner circuit when extended outward or pivoted.

Referring now from FIG. 2 to FIG. 4, and especially to FIG. 6, the receiver unit 3 of the present hand set 11 consists of a stationary receiver 31 and a movable receiver 32, wherein the movable receiver 32 can be separably associated with the stationary receiver 31 with a flange portion 321 of receiver 32 fitly inserted into a recess portion 311 of the stationary receiver 31.

A first and a second telescopic arc-shaped strips 41 and 322 having alike central longitudinal slide slot 411 and 3221 respectively, are used to connect the movable receiver 32 to the hand set 11 when said movable receiver 32 is drawn outward from the stationary receiver 31 in such a manner that the second strip 322 is rigidly and electrically engaged with the movable receiver 32 at its front end 3224 and slidably joined with the front end 414 of the first strip 41 at its rear end 3225 by a join button 53 having two enlarged end portions and an intermediate portion having a diameter slightly smaller than the width of said slide slots 411 and 3221. The join button 53 is located in both the slide slots 41 and 322 at its intermediate portion with its two enlarged end portions clamping said two strips 41 and 322 together, thus permitting relative sliding movement thereof without detachment from each other, while the first strip 41 can be retractably drawn outward from the receiver unit 3 with its rear end 415 attached to said receiver unit 3 and its front end 414 slidably joined with the second strip 322 as precedingly described.

As shown in FIG. 1 and FIG. 6, a central longitudinal recess 412 with trapezoid cross-section is formed along the upper surface of the first strip 41 for receiving the second strip 322 having identical cross-section so to effect steady sliding movement thereof without swaying.

Furthermore, the first strip 41 is slidably clamped by an electrode set 114 disposed inside the hand set 11 having a positive electrode 1141 and a negative electrode 1142 that are electrically connected with said inner circuit of the hand set 11, with its two inclined conductive sidewalls 413 of said recess 412 abutting against a pair of conductive plates 1144 of the electrodes 1141 and 1142 of said electrode set 114 respectively, while constantly keeping in contact with two reversely inclined conductive side portions 3223 of the second strip 322 received therein. Except for the above-mentioned conductive elements, all the other portions of the electrode set 114, strip 41 and strip 322 are made of insulating material.

Accordingly, as shown in FIG. 6, when drawn outward from the hand set 11 to convert the present invention into a headphone-like form, the movable receiver 32 is still electrically connected to the inner circuit of the hand set 11 by conductive plates 1144, conductive sidewalls 413 of the first strip 41 and the conductive side portions 3223 of the second strip 322 so that both of the stationary receiver 31 and movable receiver 32 can receive electrical signals and transform them into sound waves so producing double-form or stereo-like sounds.

Particularly referring to FIG. 6, two upper surface portions 4141 of said two conductive sidewalls 413 at the front end 414 of the first strip 41 are specifically made of insulating material in correspondence with said conductive plates 1144 of electrodes 1141 and 1142 respectively. Thus when assembled with the stationary receiver 31 with the first and second strips 41 and 322 retracted together inside the receiver unit 3, the movable receiver 32 is cut off from the inner circuit by the insulating upper surface portions 4141 to change the double-form or stereo-like sound into single-form sound.

With the above arrangement, since the movable receiver 32 can be freely extended outward or retracted backward to convert the hand set 11 into a headphone or vice versa, and said transmitter 21 can be adjustably extended outward or pivoted to be adjacent to a user's mouth, the hand set 11 of the present invention can be selectively used in two different modes for the user's convenience.

Figure 7:
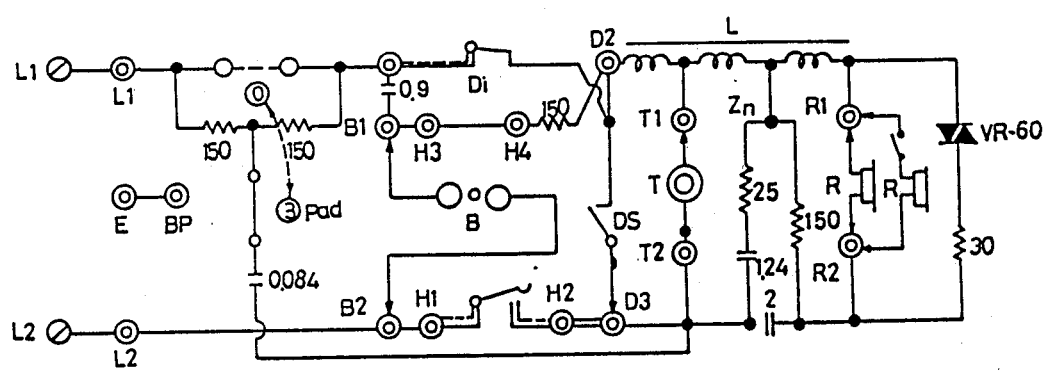
FIG. 7 is an embodiment of the inner circuit according to the present invention.
Figure 8:
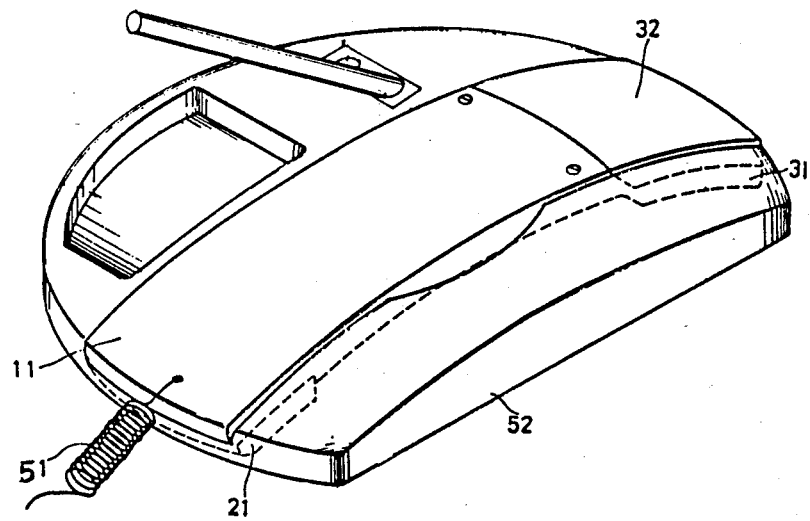
FIG. 8 is a perspective view of the hand set according to the present invention when resting in the body of the telephone.

FIG. 7 illustrates one embodiment of the inner circuit of the hand set. FIG. 8 illustrates the hand set 11 when resting in the cradle 52 of the telephone, including the telephone cord 51.

I claim:
1. A headphone-convertible telephone hand set having an inner circuit, an upper receiver unit, a lower transmitter unit and an intermediate push button board disposed therebetween comprising:
   an outwardly-extendable transmitter disposed on a transmitter seat of said transmitter unit, said transmitter having a slide member having an internal slide slot;
   a guide member provided on the transmitter seat for guiding said slide member through said slide slot for permitting selectable outward sliding movement and pivoting of said transmitter without detachment thereof from the transmitter seat;
   an extendable wire electrically connecting the inner circuit of said hand set with said transmitter for allowing the outward sliding movement of said transmitter;
   a stationary receiver having a recess;
   a movable receiver selectively outwardly slidably associated with said stationary receiver, said movable receiver having a flange portion adapted to be fitted in said recess, said stationary receiver and said movable receiver constituting said receiver unit;
   first and second telescopic arc-shaped strips, each having a central longitudinal slide slot, said strips adapted to connect said movable receiver with said hand set when said movable receiver is extended outwardly from said hand set, an upper surface of said first strip having a central longitudinal recess formed therealong for accurately receiving said second strip to effect steady sliding movement thereof, said second strip being rigidly and electrically engaged with said movable receiver at a front end thereof, a join button connected with said first and second strips for slidably joining a front end of said first strip with a rear end of said second strip for permitting relative sliding movement of said two strips without their departure from each other, said first strip being adapted to be retractably drawn out from said hand set with a rear end thereof slidably joined with the rear end of said second strip;
   said central longitudinal recess of said first strip being formed with a trapezoid cross-section, having two inclined conductive side walls, said second strip having two side portions which are oppositely inclined to said two inclined sidewalls and are made of a conductive material wherein said two side portions maintain contact with said two conductive sidewalls of said recess when said second strip is slidably received therein;
   an electrode set for slidably clamping said first strip and electrically connected with the inner circuit of said hand set with said two inclined conductive sidewalls abutting against a pair of conductive plates of said electrode set, respectively;
   wherein other portions of said electrode set, said first strip and said second strip are made of an insulating material.

2. A headphone-convertible telephone hand set as claimed in claim 1, wherein when drawn outwardly from said hand set to form a headphone, said movable receiver remains electrically connected with the inner circuit of said hand set by said conductive plates of said electrode set, said conductive sidewalls of said first strip and said conductive side portions of said second strip such that said movable receiver and said stationary receiver can both receive sound signal.

3. A headphone-convertible telephone hand set as claimed in claim 2, wherein two upper surface portions of said two conductive sidewalls at the front end of said first strip are made of an insulating material such that when the movable receiver is associated with said stationary receiver with said first and second strips retracted together inside said receiver unit, said movable receiver is cut off from the inner circuit by said upper surface portions to produce sound only in said stationary receiver.

4. A headphone-convertible telephone hand set having an inner circuit, an upper receiver unit, a lower transmitter unit and an intermediate push button board disposed therebetween comprising:
   an outwardly-extendable transmitter disposed on a transmitter seat of said transmitter unit, said transmitter having a slide member having an internal slide slot;
   a guide member provided on the transmitter seat for guiding said slide member through said slide slot for permitting selectable outward sliding movement and pivoting of said transmitter without detachment thereof from the transmitter seat;
   an extendable wire electrically connecting the inner circuit of said hand set with said transmitter for allowing the outward sliding movement of said transmitter;
   a stationary receiver having a recess;
   a movable receiver selectively outwardly slidably associated with said stationary receiver, said movable receiver having a flange portion adapted to be fitted in said recess, said stationary receiver and said movable receiver constituting said receiver unit;
   first and second telescopic arc-shaped strips, each having a central longitudinal slide slot and being adapted to connect said movable receiver to said hand set when said movable receiver is extended outwardly from said hand set, an upper surface of said first strip having a central longitudinal recess formed therealong for accurately receiving said second strip to allow sliding movement of said second strip with respect to said first step, a first end of said second strip being rigidly and electrically engaged with said movable receiver, a join button is connected with said first and second strips for slidably joining a first end of said first strip with a second end of said second strip for permitting relative sliding movement of said two strips without their departure from each other, said first strip being adapted to be retractably drawn out from said hand set with a second end thereof slidably joined with the second end of said second strip.

* * * * *